United States Patent [19]

Kobayashi

[11] Patent Number: 5,133,696
[45] Date of Patent: Jul. 28, 1992

[54] DIFFERENTIAL FOR A POWER TRANSMISSION SYSTEM OF A MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 488,339

[22] Filed: Mar. 2, 1990

[30] Foreign Application Priority Data

Mar. 31, 1989 [JP] Japan ............................... 1-082525
Mar. 31, 1989 [JP] Japan ............................... 1-082526

[51] Int. Cl.⁵ ............................................... B60K 17/16
[52] U.S. Cl. .................................... 475/86; 475/150; 475/231; 192/106 F
[58] Field of Search .............. 475/84, 86, 230, 231, 475/232, 233, 238, 239, 254, 262, 150; 192/106 F, 40.052; 74/844; 364/426.01

[56] References Cited

U.S. PATENT DOCUMENTS

| | | | |
|---|---|---|---|
| 2,991,664 | 7/1961 | Bernotas | 475/86 |
| 3,215,237 | 11/1965 | Davies et al. | 192/106 F |
| 3,974,717 | 8/1976 | Breed et al. | 475/230 X |
| 4,732,052 | 3/1988 | Dewald | 475/86 |
| 4,741,407 | 5/1988 | Torii et al | 475/86 X |
| 4,811,628 | 3/1989 | Winkam et al. | 475/86 |
| 4,862,768 | 9/1989 | Iwatsuki et al. | 475/86 |
| 4,867,010 | 9/1989 | Stettler, Jr. | 475/86 |
| 4,934,213 | 6/1990 | Niizawa | 475/86 |
| 4,957,195 | 9/1990 | Kano et al. | 192/106 F |
| 4,973,294 | 11/1990 | Kobari et al. | 475/84 X |
| 4,973,296 | 11/1990 | Shibata | 475/231 |
| 4,974,714 | 12/1990 | Goscenski, Jr. | 475/86 X |
| 4,989,686 | 2/1991 | Miller et al. | 475/150 X |

FOREIGN PATENT DOCUMENTS 62-134339 6/1987 Japan .
62-143719 6/1987 Japan .

Primary Examiner—Richard Lorence
Assistant Examiner—Khoi Q. Ta
Attorney, Agent, or Firm—Martin A. Farber

[57] ABSTRACT

A power transmitting device of a bevel gear differential provided coaxially with axles. The differential has a differential case, a pair of pinions rotatably supported in the differential case, a pair of side gears meshed with the pinions and secured to respective axles of the vehicle, and a final reduction gear secured to the differential case. A fluid-operated clutch controls the differential operation of the limited slip differential. The clutch has an outer drum integral with the differential case, an inner drum connected to one of the side gears, a plurality of outer disks secured to the outer drum, a plurality of inner disks secured to the inner drum, a piston slidably mounted in a piston chamber and operated by oil supplied to the piston chamber for engaging the outer drum with the inner drum, the outer disks and inner disks being disposed alternately with each other. Sealing members separate oil supplied to the piston chamber from oil for lubricating the final reduction gear.

9 Claims, 16 Drawing Sheets

DIFFERENTIAL FOR A POWER TRANSMISSION SYSTEM OF A MOTOR VEHICLE

BACKGROUND OF THE INVENTION

The present invention relates to a power transmission system for a motor vehicle, and more particularly to a differential operation restricting (a limited slip) system with a hydraulically-operated multiple-disk friction clutch in which hydraulic pressure applied to the clutch is controlled for variably changing transmission torque to right and a left driving wheels in accordance with driving conditions of the motor vehicle and the surface conditions of the road.

Japanese Patent Application Laid-Open No. 62-143719 discloses a system in which a hydraulically operated multiple-disk friction clutch is provided between a differential case and a side gear of a differential for producing torque to restrict differential operations. Hydraulic pressure for the clutch is controlled for changing the bias ratio of a limited slip differential so as to improve the steerability of the motor vehicle.

The same lubricant for the multiple-disk friction clutch as that of an automatic transmission is used for actuating and lubricating the clutch, since hydraulic fluid has a good friction characteristic and a low oil viscosity. On the other hand, a final reduction gear in a differential housing provided on the outside of the differential case is composed of a hypoid gear. In such a differential, an extreme pressure agent is provided which contains additives to improve the ability to adhere to the surfaces of metals under high bearing pressures. A lubricant is subject to cause the multiple disks of the clutch to stick and to slip because of unstable friction characteristics, which causes unpleasant vibration and noise in the vehicle body.

SUMMARY OF THE INVENTION

An object of the present invention is to provide a limited slip differential system which may prevent the multiple disks of the fluid operated multiple-disk friction clutch from sticking and slipping.

Another object of the invention is to provide a system which may improve control of the accuracy of the actuating hydraulic pressure applied to the clutch.

The other objects and features of this invention will become understood from the following description with reference to the accompanying drawings.

BRIEF DESCRIPTION OF DRAWINGS

FIGS. 11a and 11b show a hydraulic control system for the second embodiment.

DETAILED DESCRIPTION OF THE PREFERRED EMBODIMENTS

Figure 1:
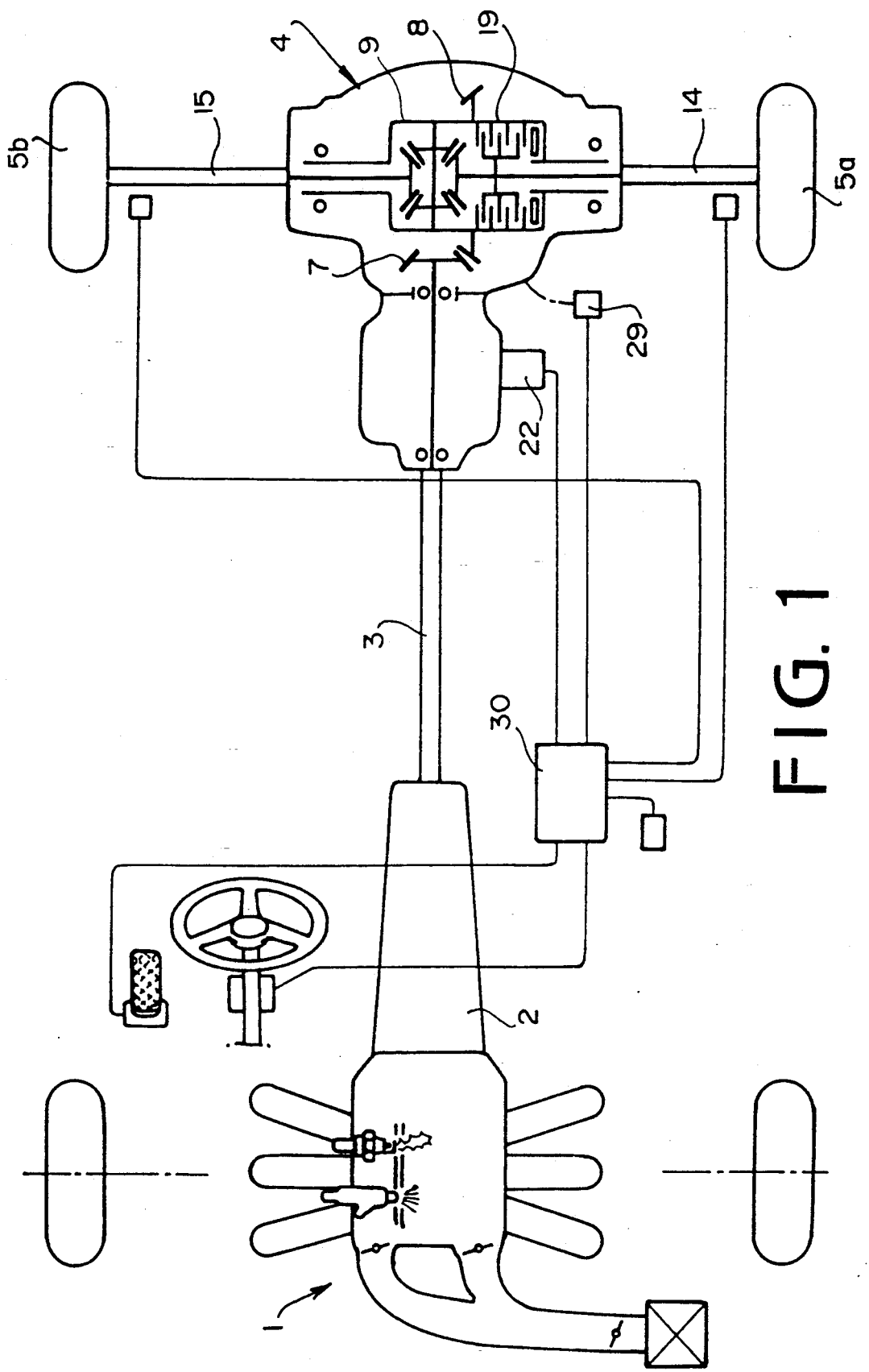
FIG. 1 is a schematic diagram showing a power transmission system according to the present invention.

Referring to FIG. 1, a power transmission system for a motor vehicle according to the present invention has an engine 1 at a front portion of the vehicle and a transmission 2 disposed in the longitudinal direction of the vehicle. The transmission 2 is connected to a differential device 4 for rear wheels through a propeller shaft 3. The differential device 4 comprises a bevel gear differential 9 for transmitting the power of the transmission 2 to rear drive wheels 5a and 5b through axles 14 and 15, respectively, and a fluid-operated multiple-disk friction clutch 19 for controlling the differential operation of the differential 9.

Figure 2A:
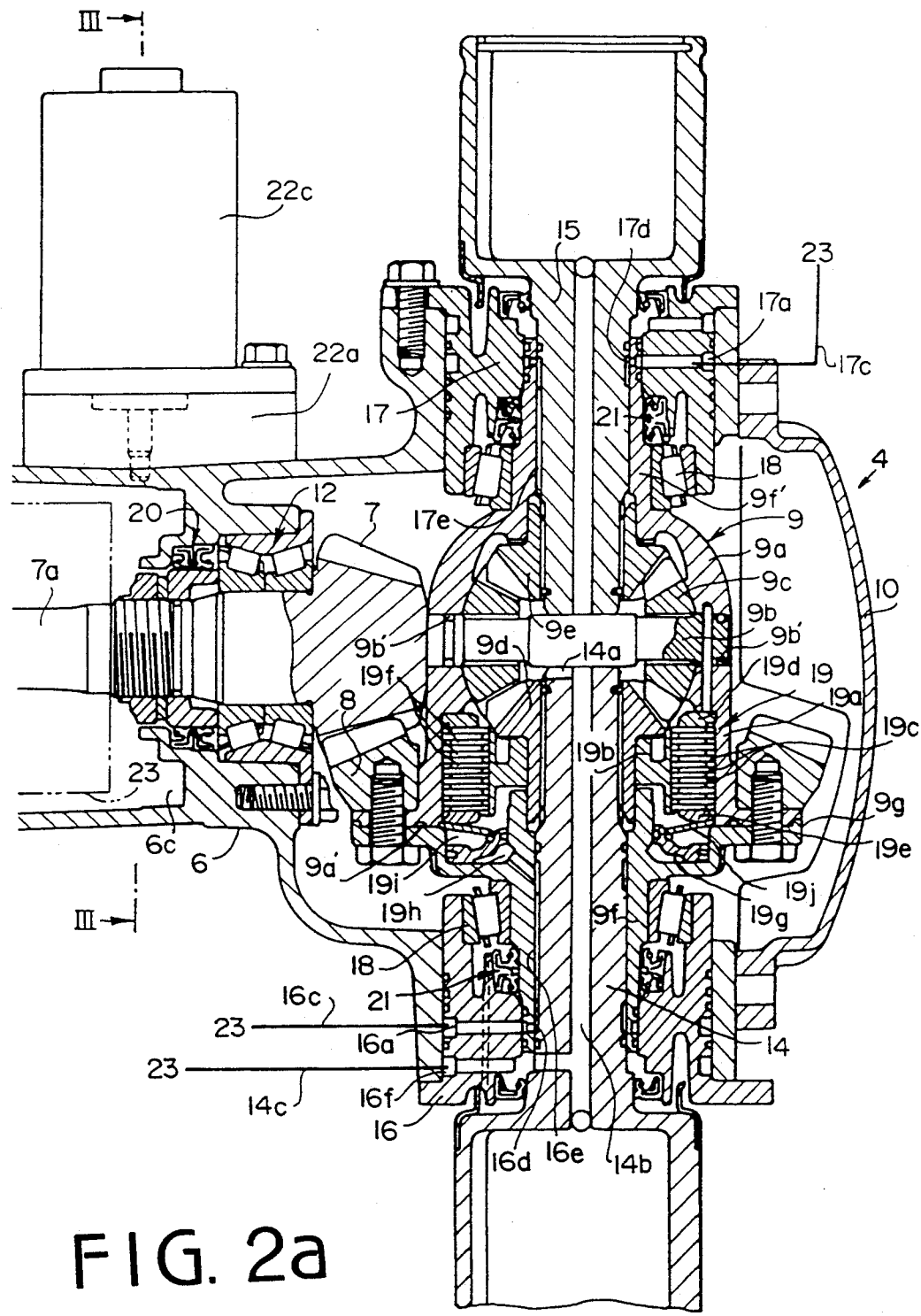
FIGS. 2a and 2b show a sectional view of a main part of the system.
Figure 2B:
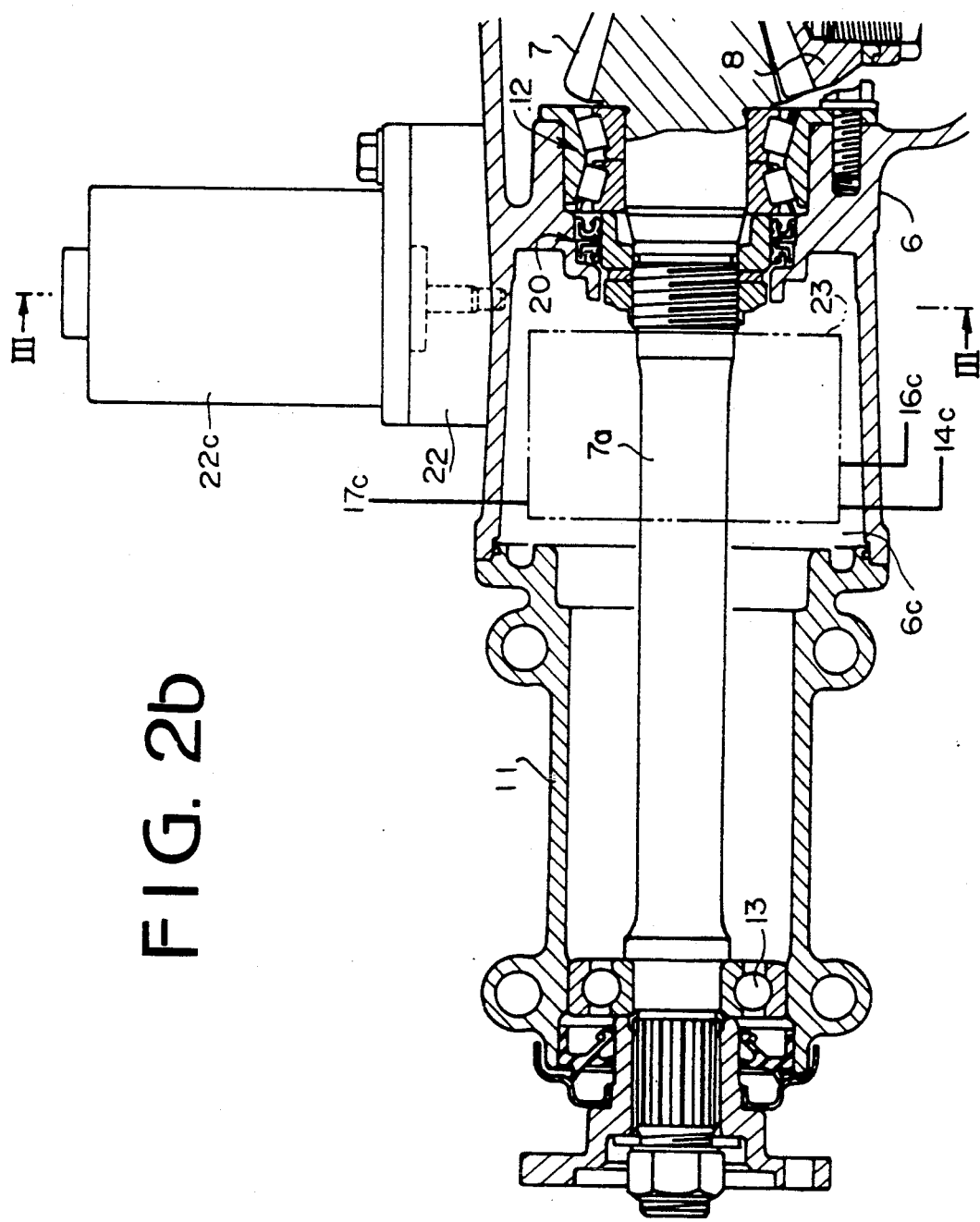

Referring to FIGS. 2a and 2b, the differential device 4 is housed in a carrier 6 having an extension case 11 secured to a front end thereof. A cover 10 is secured to a rear end of the carrier 6. A drive pinion shaft 7a integral with a drive pinion 7 is rotatably mounted in the carrier 6 through a double taper roller bearing 12 and in the extension case 11 through a ball bearing 13 and connected to the propeller shaft 3. The drive pinion 7 engages with a final reduction gear 8 secured to a differential case 9a of the bevel gear differential 9 by bolts at a flange 9g thereof. Both the drive pinion 7 and the final reduction gear 8 are composed of hypoid gears.

The differential 9 housed in the differential case 9a comprises a pinion shaft 9b rotatably supported in the case 9a, a pair of differential pinions 9c rotatably mounted on the pinion shaft 9b, and pair of side gears 9d and 9e meshed with the pinions 9c.

The axle 14 of the left rear wheel 5a is splined to a hub of the side gear 9d and rotatably supported in a cylindrical portion 9f of the differential case 9a. The axle 15 of the right rear wheel 5b is splined to the hub of the side gear 9e and rotatably supported in a cylindrical portion 9f' integral with the case 9a. The cylindrical portions 9f and 9f' are rotatably supported in retainer bearings 16 and 17 through tapered roller bearings 18, 18, the retainer bearings 16 and 17 being secured to the carrier 6.

The fluid operated multiple-disk friction clutch 19 is disposed between the differential case 9a and the side gear 9d of the rear differential 9. The clutch 19 is mounted on an inside wall of the differential case 9a of the rear differential 9. The differential case 9a is used as an outer drum 19a of the clutch 19. An inner drum 19b is splined to the hub of the side gear 9d and engaged with the inner end of the cylindrical portion 9f. A plurality of outer disks 19c are splined on an inner periphery of the outer drum 19a together with a pair of retainers 19d and 19e provided adjacent both end disks 19c, and a plurality of inner disks 19f are splined on an outer periphery of the inner drum 19b, disposed alternately with the disks 19c. A ring piston 19g is slidably engaged with an inner periphery of the cylindrical portion 9f. A piston oil chamber 19h is formed between the piston 19g and the case 9a. A centrifugal oil pressure chamber 19i is defined opposite to the oil chamber 19h. A spring 19j is disposed in the chamber 19i between the piston 19g and the retainer 19e. In the carrier 6 and the extension case 11, a space 6c is formed for storing the actuating oil of the clutch 19.

An oil seal 20 is disposed between the carrier 6 and the outer periphery of the drive pinion shaft 7a. Oil seals 21 are disposed between the outer peripheries of the cylindrical portions 9f and 9f' and the retainer bearings 16 and 17, respectively. Sealings 9b' are disposed between the pinion shaft 9b and the case 9a, and a sealing 9a' is provided in the flange 9g.

Since the characteristics of the oil for the clutch 19 and the rear differential 9 and the oil for lubricating the hypoid gears 7 and 8 and bearings 12 and 18, are different from each other, the oil seals 20, 21 prevent the lubricating oil from entering the space 6c.

An oil pump 22 is secured to a side of the carrier 6 for supplying oil to the clutch 19 and the rear differential 9.

Figure 3:
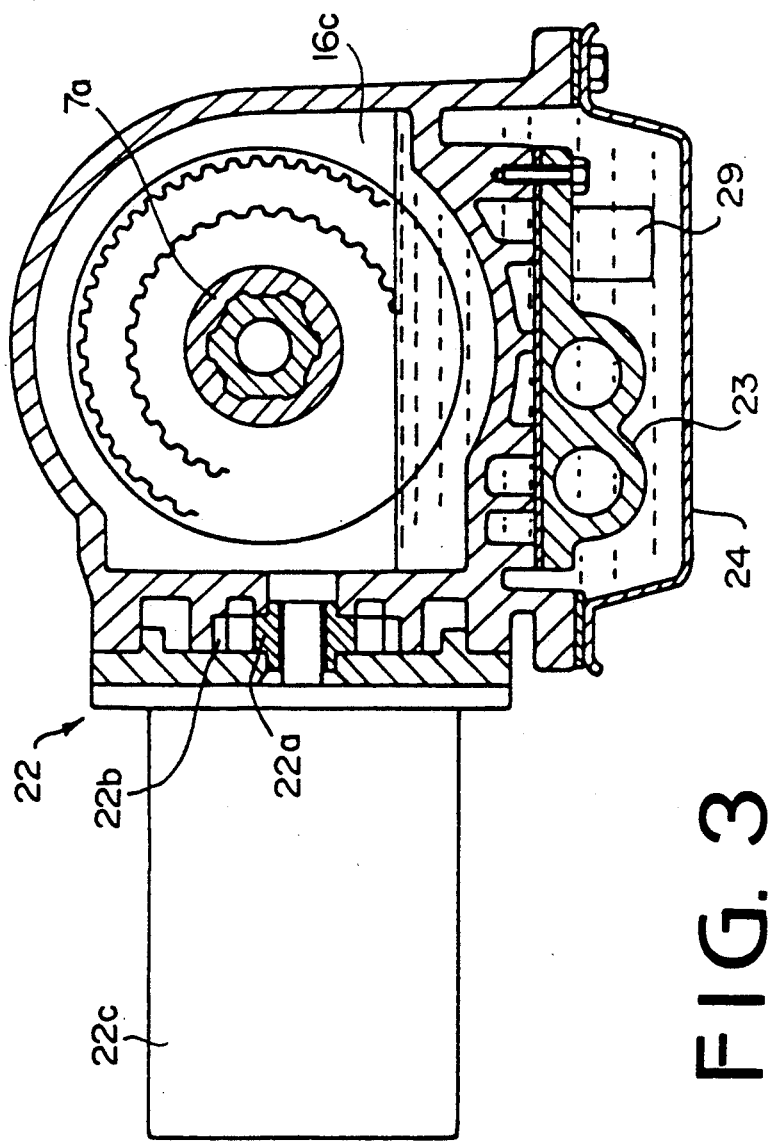
FIG. 3 is a sectional view taken along a line III—III of FIG. 2.
Figure 4A:
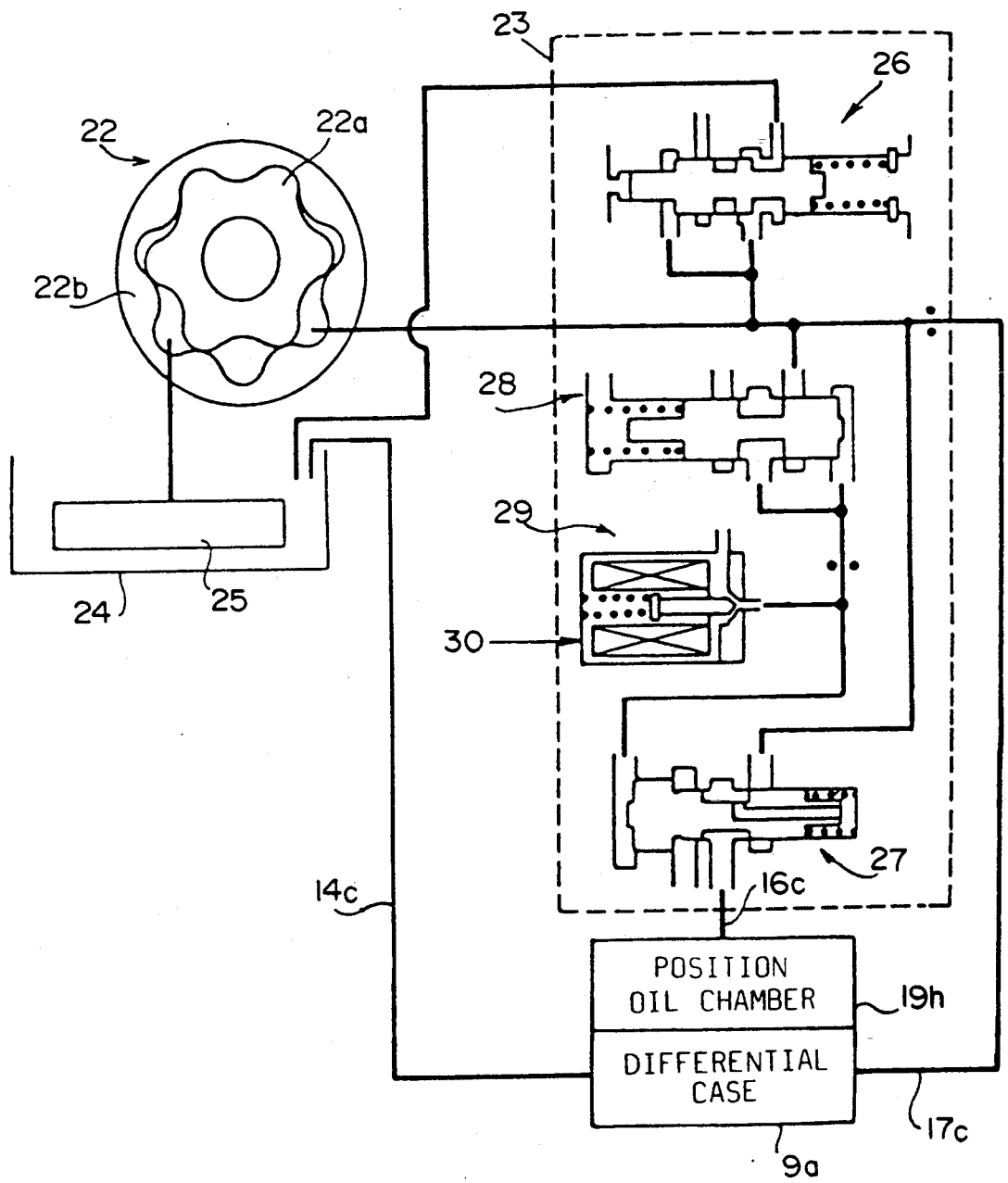
FIGS. 4a and 4b show a hydraulic control system for controlling a fluid operated multiple-disk friction clutch of the system.
Figure 4B:
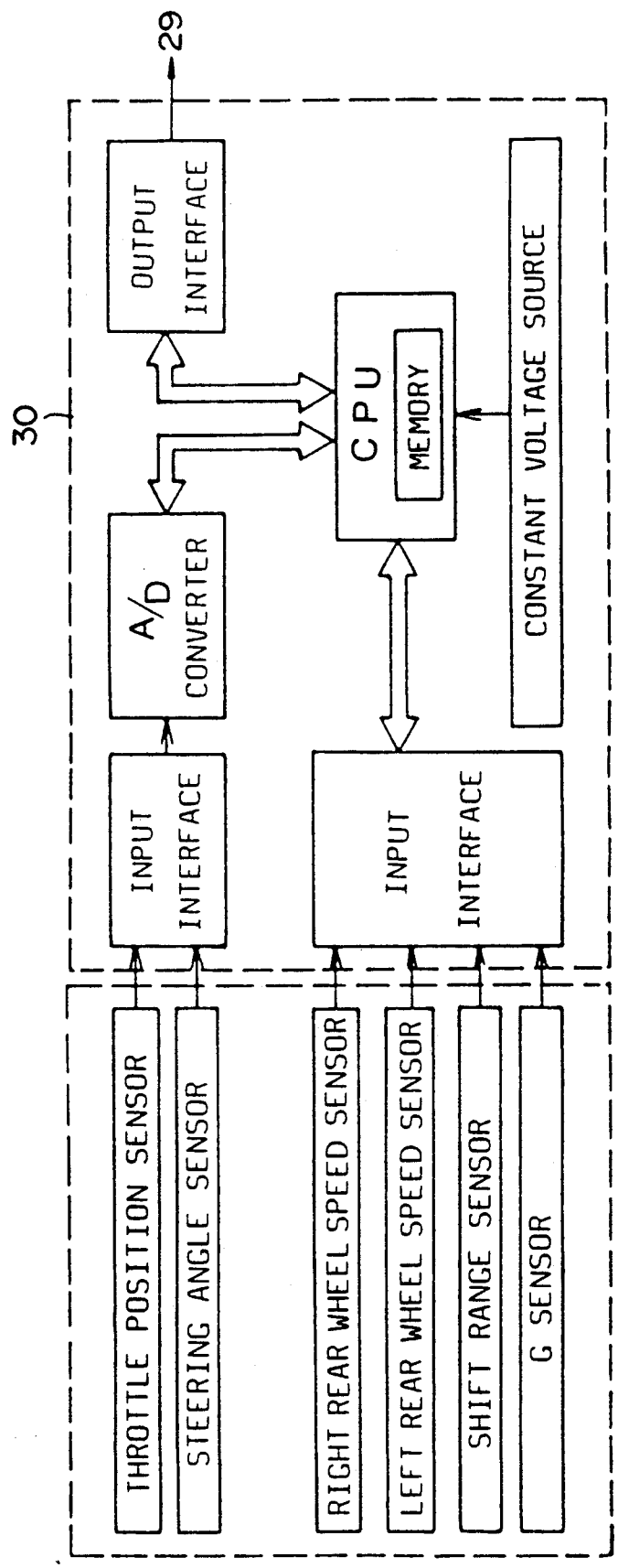

As shown in FIG. 3, an oil reservoir 24 is provided on the underside of the carrier 6. An oil pressure control unit 23 is provided in the reservoir 24. The oil pump 22 has an electric motor 22c, an inner rotor 22a mounted on an output shaft of the motor 22c and an outer rotor 22b engaged with the inner rotor 22a. The oil pump 22 is communicated with the control unit 23 and with an oil strainer 25 of the oil reservoir 24 through oil passages (not shown).

Outlets of the oil pressure control unit 23 are communicated with inlet ports 16a and 17a provided in the retainer bearings 16 and 17 through passages 16c and 17c. The inlet port 16a communicates with the oil chamber 19h of the clutch 19 through a port 16d provided in the cylindrical portion 9f of the case 9a and a spiral groove 16e formed on the outer periphery of the axle 14. The inlet port 17a communicates with the inside of the case 9a through a port 17d provided in the cylindrical portion 9f' and a spiral groove 17e formed on the outer periphery of the axle 15.

A drain port 16f formed in the retainer bearing 16 communicates with the inside of the case 9a through a passage 14b and a groove 14a formed in the axle 14. The port 16f communicates with an inlet of the oil pressure control unit 23 through a drain passage 14c.

A hydraulic control system for the clutch 19 is described hereinafter with reference to FIGS. a, 4b. The hydraulic control system comprises the oil pressure control unit 23 and a control unit 30. The control unit 23 has a pressure regulator valve 26, a clutch control valve 27, a solenoid operated duty control valve 29 and a pilot valve 28.

Oil from the oil pump 22 is supplied to the pressure regulator valve 26 by which the pressure of oil is regulated to a predetermined value. The oil is fed to the piston chamber 19h of the transfer clutch 19 through the clutch control valve 27. The pilot valve 28 operates so as to provide a constant pilot pressure. The solenoid operated duty control valve 29 is operated by pulses from the control unit 30 at a duty ratio dependent on driving conditions of the vehicle, so that drainings of the oil from the control valve 29 provides a control pressure. The control pressure is applied to an end of the transfer control valve 27 to control the oil supplied to the clutch 19 so as to control the clutch pressure.

The control unit 30 has a CPU having a memory, input interfaces, an A/D converter, an output interface and a constant voltage source. Output signals from a throttle position sensor, a steering angle sensor, a right rear wheel speed sensor, a left rear wheel speed sensor, a shift range sensor, and an acceleration sensor (G sensor) are applied to the CPU through the interfaces and the A/D converter for determining the driving conditions of the motor vehicle. An optimum duty ratio is derived from a map stored in the memory in accordance with the vehicle speed and a throttle opening degree detected by the right and left rear wheel speed sensors and the throttle position sensor, respectively, and applied to the solenoid-operated duty control valve 29 through the output interface to provide the control pressure for the clutch control valve 27.

Figure 5A:
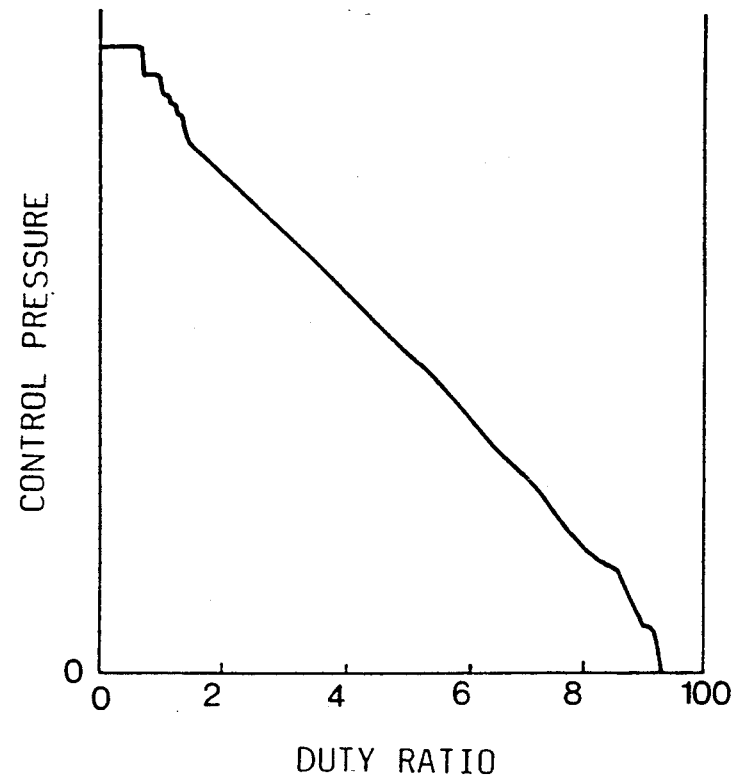
FIG. 5a is a graph showing a characteristic of control pressure.
Figure 5B:
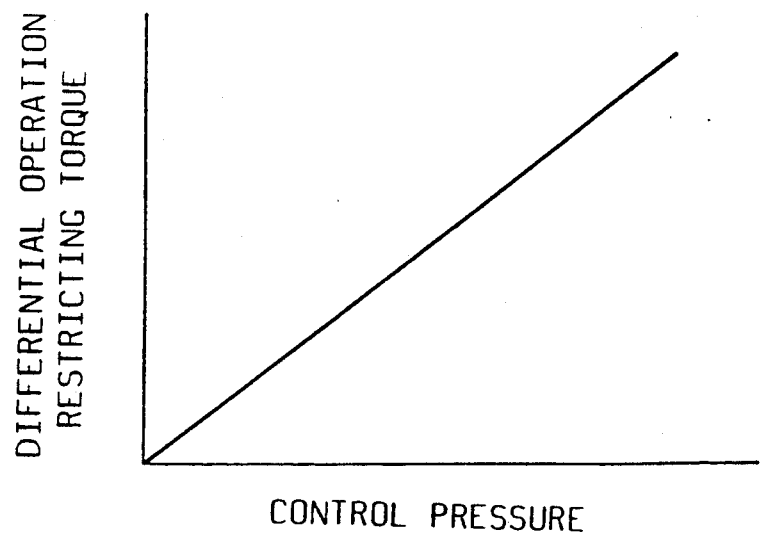
FIG. 5b is a graph showing a characteristic of differential operation restricting torque.

FIG. 5a shows a relationship between the duty ratio and the control pressure, and FIG. 5b shows a relationship between the differential operation restricting torque and the control pressure.

The oil regulated by the regulator valve 26 is applied to the differential case 9a through the port 17a of the retainer bearing 17 for lubricating the pinions 9c and the side gears 9d, 9e of the rear differential 9 and the disks 19c and 19f of the clutch 19. Further, the oil is applied to the centrifugal oil pressure chamber 19i provided between the piston 19g and the spring 19j. The oil is drained from the differential case 9a to the oil reservoir 24 through the passage 14b in the axle 14 and the drain passage 14c.

Figure 6:
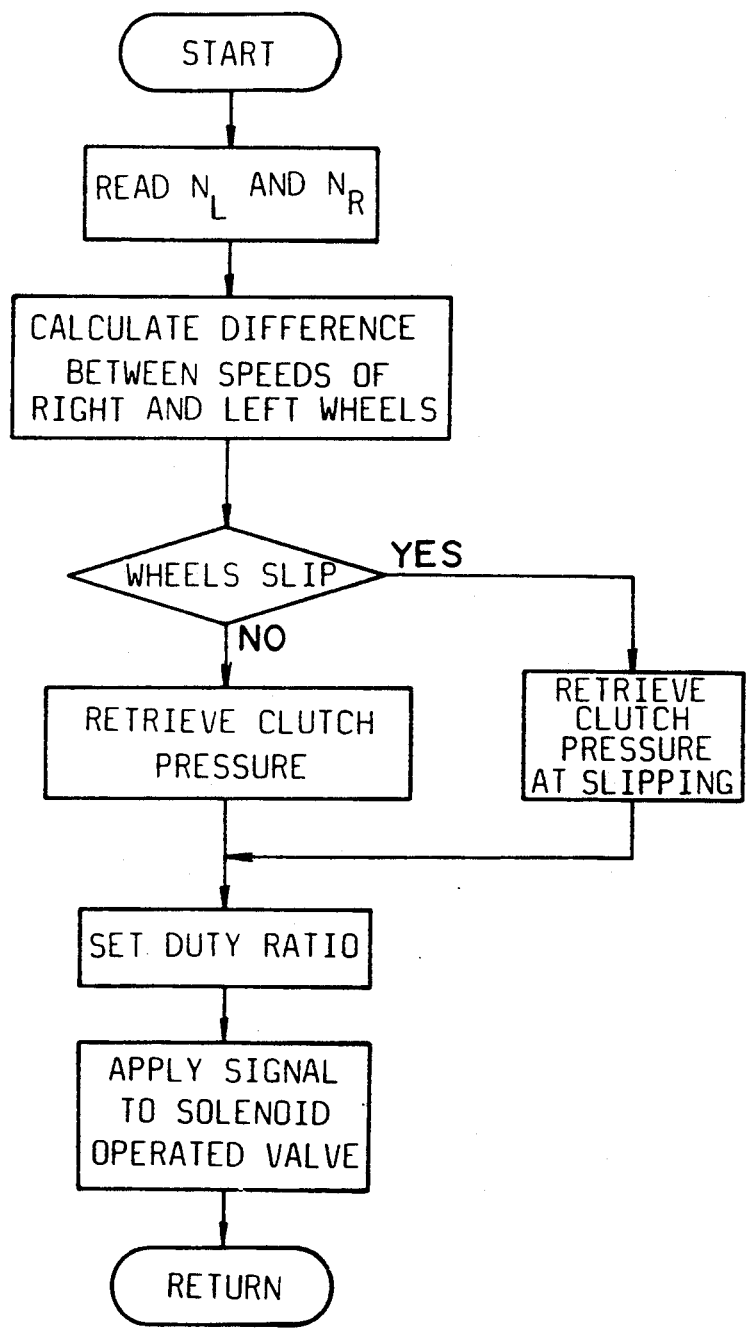
FIG. 6 is a flowchart showing the operation of a control unit of the system.
Figure 7:
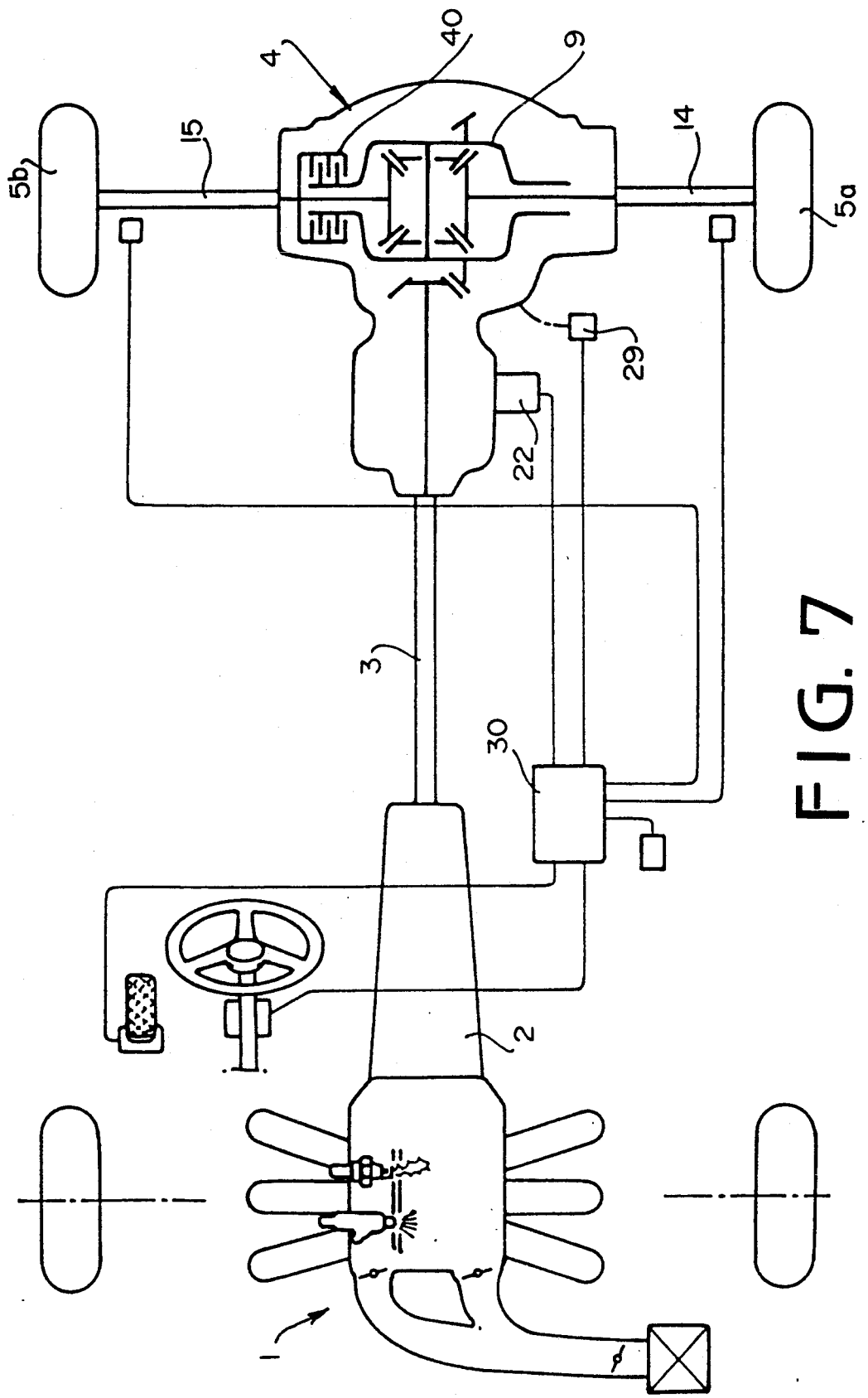
FIG. 7 is a schematic diagram showing a second embodiment of the present invention.
Figure 8A:
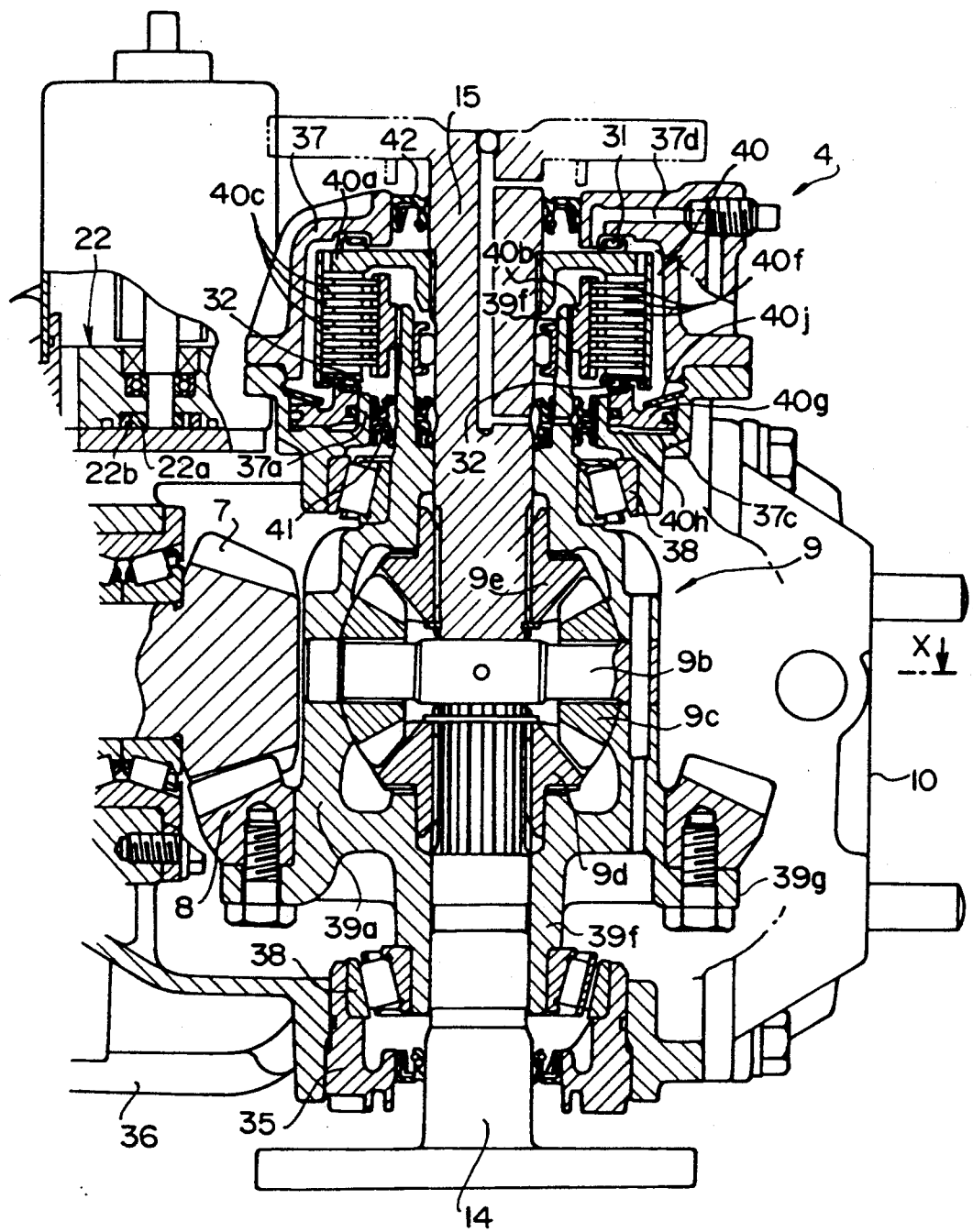
FIGS. 8a and 8b are a sectional view showing a main part of the second embodiment.
Figure 8B:
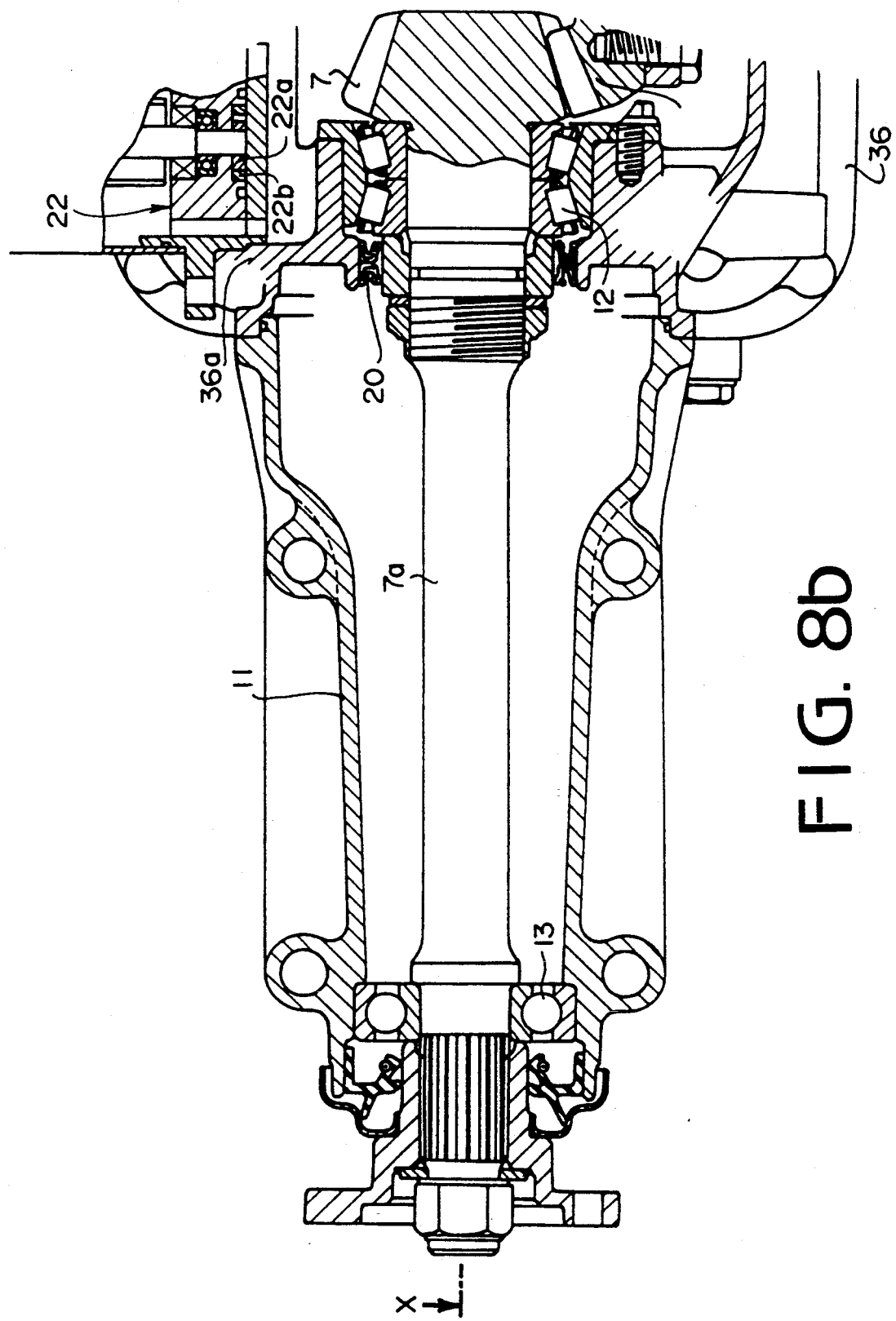

FIG. 6 is a flowchart showing the operation of the control unit 30.

The left wheel speed $N_L$ and the right-wheel speed $N_R$ are detected and slipping of the left wheel and the right wheel is calculated. If the slip ratio is smaller than a set value, a limited slip differential torque is derived from a look up table in accordance with the throttle opening degree, the vehicle speed, a shift position and a steering angle. The duty ratio corresponding to the derived clutch torque is applied to the solenoid operated valve 29. When the slip ratio is larger than the set value, the clutch torque is derived from the look-up table for operating the valve 29 during slipping.

Describing the operation of the system, the power of the engine 1 is transmitted to the transmission 2 by which the transmission ratio is automatically controlled. The output of the transmission 2 is transmitted to the differential device 4 through the propeller shaft 3. The power is transmitted to the rear-wheels 5a and 5b through the rear differential 9.

In the system, the clutch 19 is disposed between the differential case 9a and the side gear 9d of the rear differential 9 for continuously varying the limited slip differential torque in accordance with the transmitting torque of the clutch. Namely, the differential torque is changed in accordance with the clutch pressure controlled by the duty ratio signal from the control unit 30.

For example, if a duty ratio of 100% is applied to the duty control valve 29, the clutch 19 is disengaged so that the transmission torque is zero and the differential operation is not restricted.

In straight ahead driving, if road resistances on the right and the left rear wheels are equal, the resistance exerted on the side gears 9d and 9e of the rear differential 9 are equal to each other. Thus, the pinions 7 do not rotate. The differential 9a, the pinion shaft 9b and the side gears 9d and 9e are integrally rotated. 50% of the torque is transmitted to the right and the left rear wheels, respectively. The vehicle can negotiate a corner with the differential operation.

However, if one of the rear wheels runs on a road having a high friction coefficient such as a paved road and the other wheel runs on a road having a low friction coefficient such as a snowy road, the road resistances on the respective wheels are different from each other. If the differential case 9a rotates, the differential operation is performed because of the difference between the road resistances on the right and the left rear wheels. Consequently, the driving power is not transmitted to the wheel on the road having a high friction coefficient so that it is difficult to move the vehicle on a slippery road such as a muddy road, an off road or a snowy road.

If 0% duty ratio is applied to the duty control valve 29, the clutch 19 is engaged to lock the rear differential 9. In this state, if the right and the left rear wheels of the vehicle are on the road having different friction coefficients, 50% torque is transmitted to the respective rear wheels, thereby ensuring the driving power of the wheels.

In particular, if the duty ratio is increased, the transmitting torque of the clutch 19 reduces to gradually release the locking of the differential. If the limited slip differential torque is set to a moderate and small value, the proper differential operation is effected under various driving conditions of the vehicle. The differential torque is controlled within a preferable range so as to distribute the torque to the left and the right rear wheels 5a and 5b at a proper ratio in accordance with the driving conditions and the surface conditions of the road.

Since the control unit 30 for the clutch 19 calculates an appropriate duty ratio in accordance with the signals from the sensors and the table for the duty ratio, it is possible to control the torque to the respective rear wheels 5a and 5b dependent on the driving conditions of the motor vehicle and the surface conditions of the road, thereby improving the driving stability, driveability and starting characteristics of the vehicle.

In a vehicle having an antilock braking system on a brake system, when the antilock braking is effected, the difference of the rotating speeds between the right and the left rear wheels 5a and 5b is obtained by disengaging the clutch 19. Thus, the antilock braking is effected.

Since the clutch 19 is provided with the oil having a proper characteristic, the uncomfortable repeat of disk sticking and slipping do not occur. Thus, uncomfortable oscillation and noise are prevented, and the reliability and durability of the power transmitting system are improved.

When the centrifugal force of the fluid is exerted in the chamber 19h, the piston 19g urges the end disk. However, the centrifugal force of the fluid in the chamber 19i is exerted on the piston 19g. Thus, the oil pressure exerted on the piston 19g by the centrifugal force in the oil chamber 19h is cancelled (compensated), thereby ensuring the control of the clutch torque in accordance with the clutch pressure.

Figure 9:
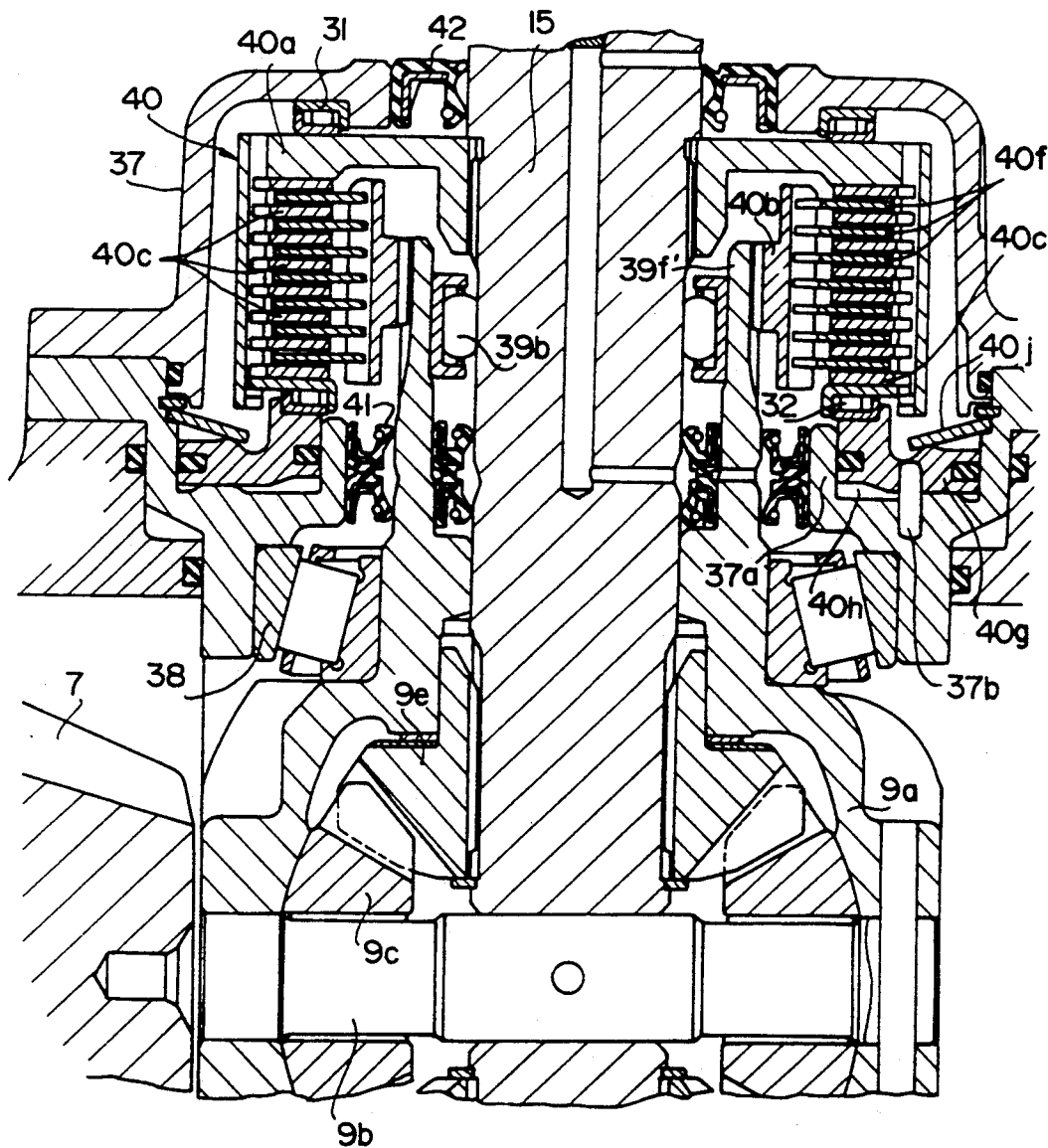
FIG. 9 is a sectional view of a clutch of the second embodiment.
Figure 10A:
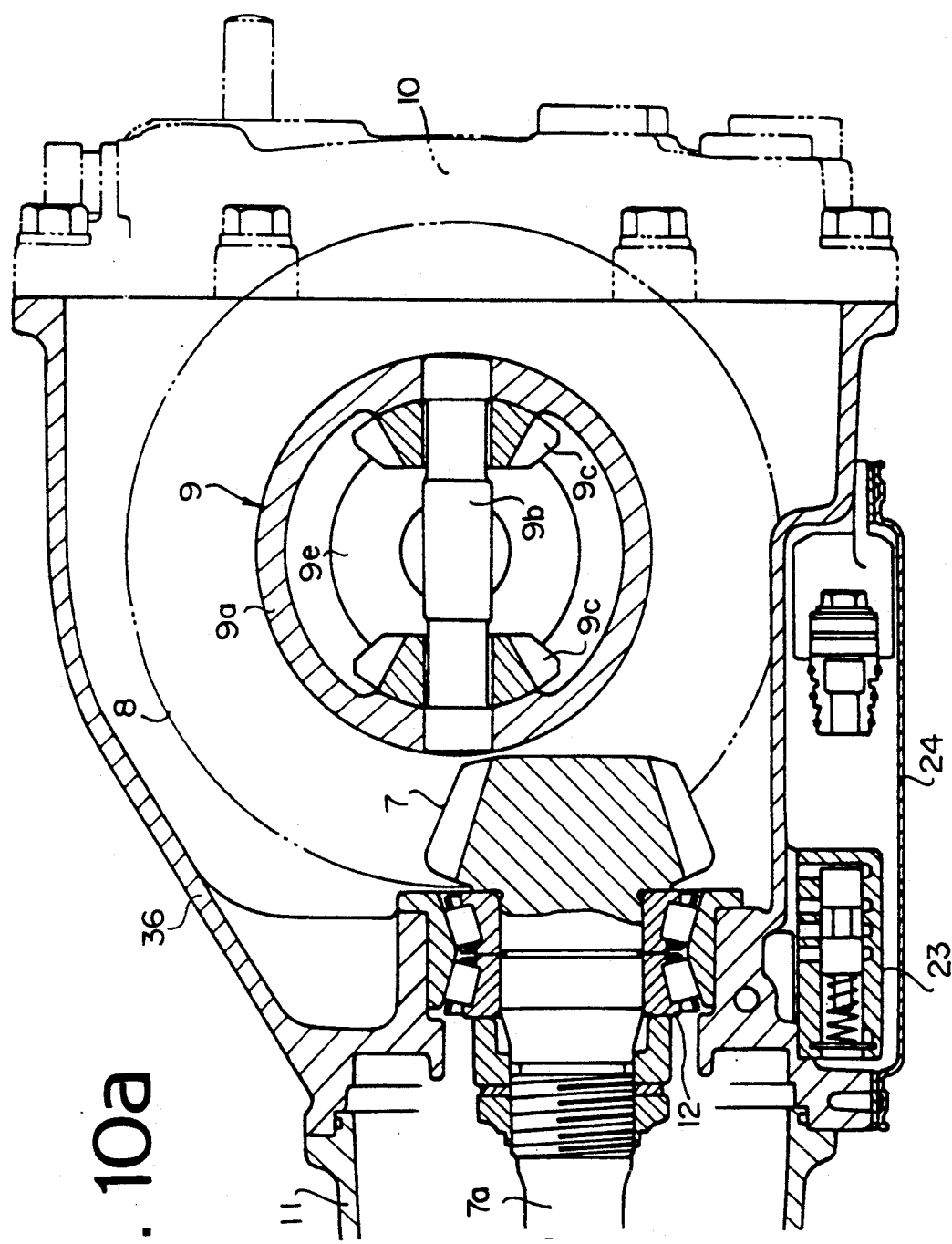
FIGS. 10a and 10b are a sectional view taken along a line X—X of FIG. 8.
Figure 10B:
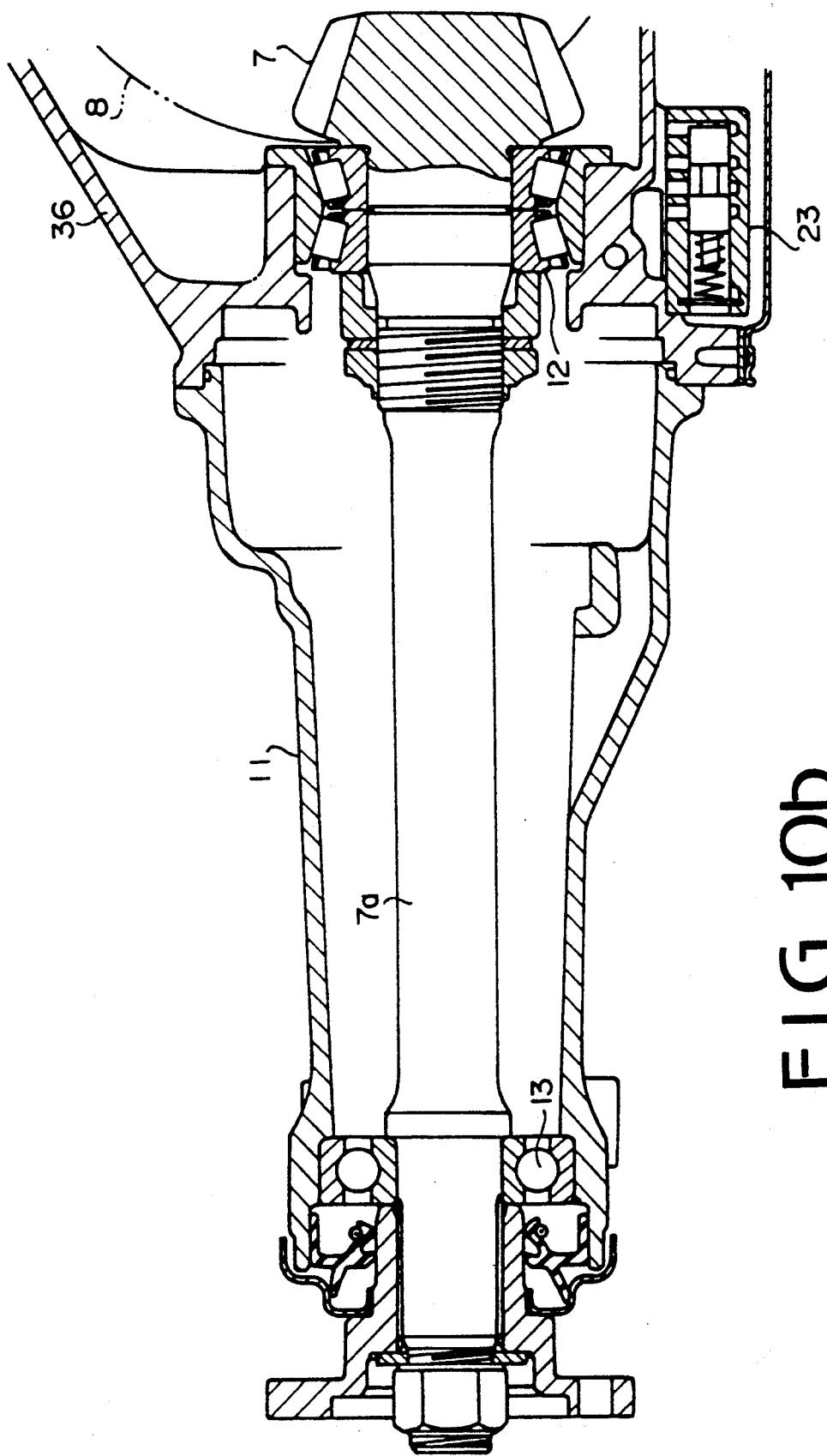

FIGS. 7 to 11 show a second embodiment of the invention. A carrier 36 of the differential device 4 is connected to the extension case 11 in which the drive pinion shaft 7a is rotatably mounted. The final reduction gear 8 engaged with the drive pinion 7 is secured to a flange 39g of a differential case 39a by bolts. The differential case 39a of the rear differential 9 has a cylindrical portion 39f in which the axle 14 is rotatably supported and a cylindrical portion 39f' rotatably supporting the axle 15 through a bearing 39b (FIG. 9). The cylindrical portion 39f is rotatably supported in a retainer bearing 35 secured to the carrier 36 through a taper roller bearing 38. The cylindrical portion 39f' is rotatably supported in a clutch housing 37 through a taper roller bearing 38.

A fluid operated multiple-disk friction clutch 40 is housed in the clutch housing 37 and mounted on the axle 15 and the cylindrical portion 39f'. The oil pump 22 is provided in an oil pump carrier 36a of the carrier 36 for supplying oil to the clutch 40.

Referring to FIG. 9, the clutch 40 comprises an outer drum 40a secured to the axle 15 and an inner drum 40b splined on the cylindrical portion 39f'. A plurality of outer disks 40c are splined on the drum 40a and a plurality of inner disks 40f are splined on the drum 40b, disposed alternately with the disks 40c. A ring piston 40g is slidably mounted on an inner wall of the clutch housing 37 and on an inner guide portion 37a thereof. The ring piston 40g is engaged with a knock pin 37b mounted in the clutch casing 37 so as to prevent the piston 40g from rotating. The piston 40g engages with the outermost disk 40c through a thrust bearing 32 and with a spring 40j. A piston oil chamber 40h is defined between the piston 40g and the housing 37.

When the drive drum 40a rotates, the disks 40c are rotated. However, since the piston 40g is engaged with the clutch housing 37 through the knock pin 37b, the piston 40g does not rotate. Further, the piston chamber 40h is formed by the piston 40g and the clutch housing 37 and hence it does not rotate. Accordingly, centrifugal force of the oil is not generated in the chamber 40h. Thus, the actuating pressure of the oil of the clutch 40 is accurately controlled, thereby improving control accuracy of the clutch 40. In the clutch housing 37, oil seals 41 and 42 are provided on outer peripheries of the cylindrical portion 39f and the axle 15, respectively.

Since the characteristics of the oil for the clutch 40 and the rear differential 9 of the differential and for the hypoid gears 7 and 8, the bearings 12 and 38, the are different from each other, the oil seals 41 and 42 are provided for preventing both of the oils from mixing.

Figure 11A:
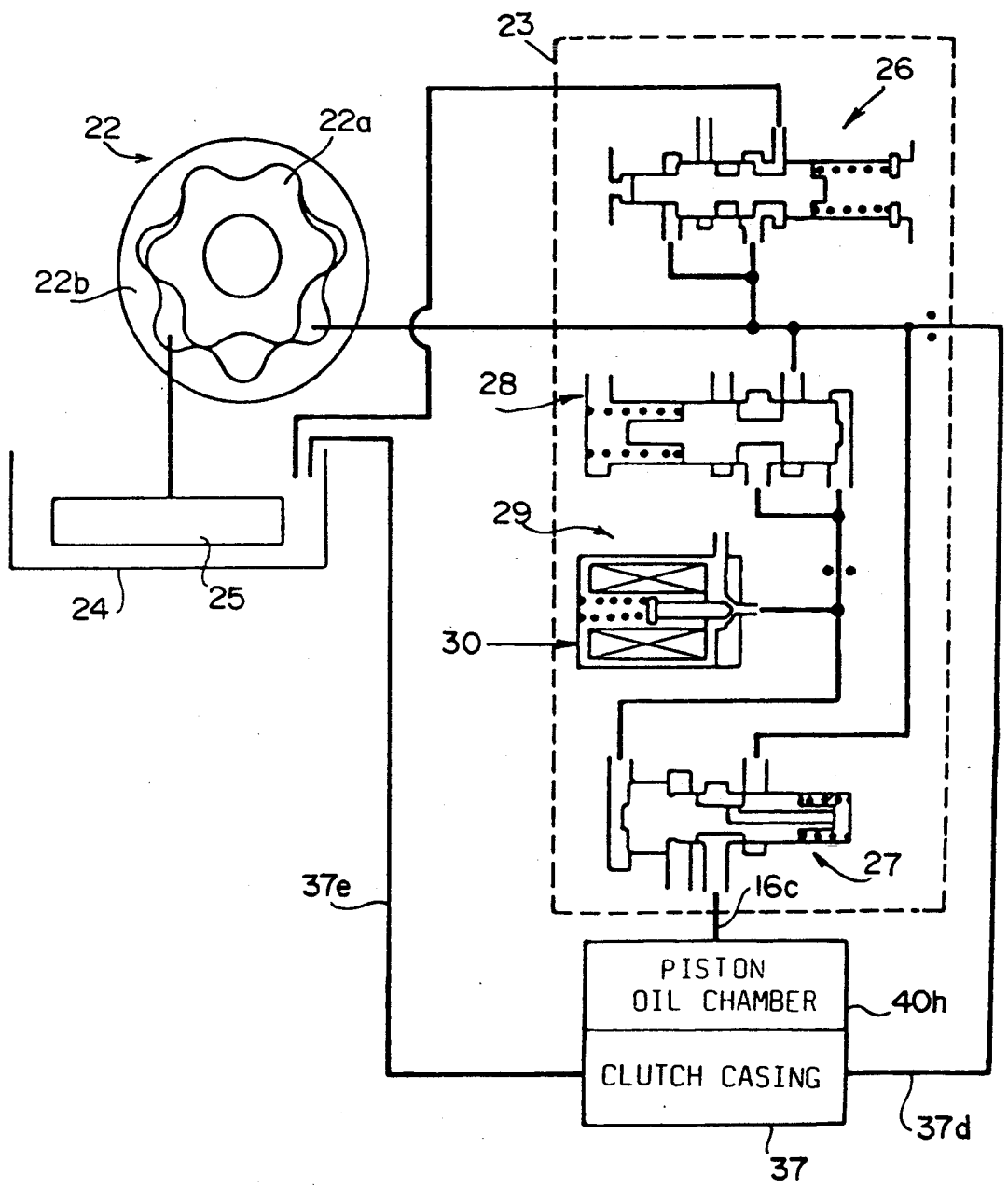
Figure 1B:
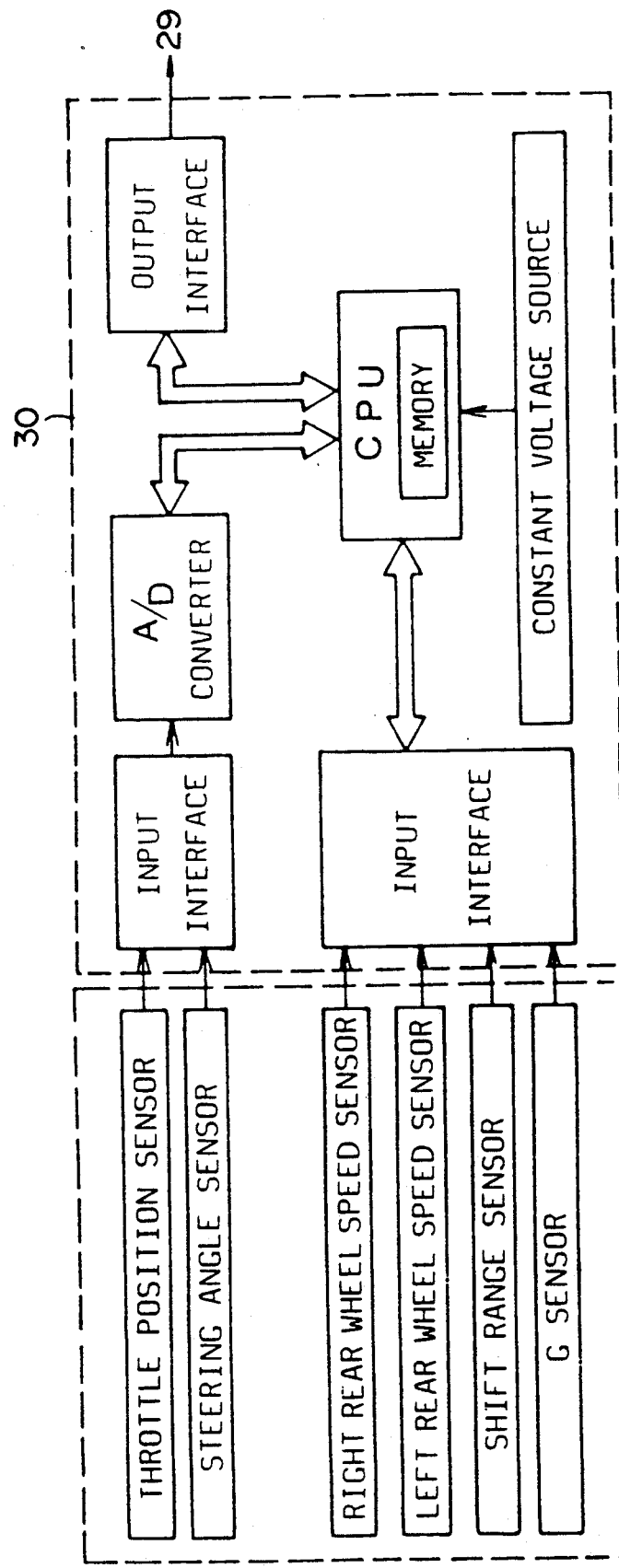

The oil pressure control unit 23 is communicated with the oil chamber 40h through a passage (not shown) and a port 37c of the clutch housing 37. As shown in FIG. 11, the lubricating oil is applied to the clutch housing 37 through a passage 37d and the oil is drained from the housing 37 through a drain passage 37e.

The other structures are the same as in the first embodiment and the same parts thereof are identified with the same reference numerals as FIGS. 1 to 4.

The hydraulic control system is controlled in the same manner as the first embodiment.

Consequently, the same effect as described hereinbefore in the first embodiment.

Although the system of the above described embodiment of the present invention is applied to the rear-drive vehicle with a front-mounted engine, the system of the invention can be applied to a four-wheel drive vehicle having an independent differential provided on either of the front wheels or the rear wheels, or a vehicle having a plurality of driving wheels.

The oil pump and an oil pressure control unit of the clutch can be provided on the outside of the differential such as the vehicle body, the engine or the transmission system, connected by the external pipes.

In accordance with the present invention, the clutch disposed between the differential case and the side gear operates to produce the torque for restricting the differential operation of the differential. The limited slip differential torque is continuously changed in accordance with the control of the clutch pressure. Thus, the differential torque is transmitted to the right and left rear wheels at a desired ratio dependent on the driving conditions of the motor vehicle and the surface conditions of the road. Therefore, the vehicle can be easily driven on slippery roads. Further, optimum driveability and driving stability of the vehicle is obtained and steerability of the vehicle is controlled.

Since the clutch and the rear differential are provided in the differential carrier separated from the hypoid gears, oil having the appropriate characteristic can be used. Thus, the sticking/slipping of disks does not occur when the wheels turn around a corner.

Further, the clutch contains the centrifugal oil pressure chamber 19i so that the oil pressure exerted on the piston by the centrifugal force in the piston oil chamber is cancelled (compensated), thereby ensuring the control of the clutch pressure.

While the presently preferred embodiments of the present invention have been shown as described, it is to be understood that these disclosures are for the purpose of illustration and that various changes and modifications may be made without departing from scope of the invention as set forth in the appended claims.

What is claimed is:

1. In a differential device for a power transmission system of a motor vehicle having an engine mounted on said motor vehicle, a transmission connected to said engine, and a propeller shaft connected between said transmission and said differential device for transmitting power from said engine to axles of driving wheels of the vehicle, and a final reduction gear mounted on a differential case and meshed with a pinion gear of said propeller shaft, the differential device comprising the differential case and a differential in the differential case operatively connected to the driving wheels, the vehicle having a throttle sensor for detecting opening degree of a throttle valve and for generating a degree signal, a steering angle sensor mounted on a steering shaft for detecting steering angle of a steering wheel of the vehicle and for generating a steering angle signal, wheel speed sensor for detecting each wheel speed of said driving wheels and for producing wheel speed signals respectively, gear position sensor mounted on said transmission for detecting a shift range and for generating a gear position signal, and an acceleration sensor mounted on said vehicle for detecting acceleration of said vehicle and for producing an acceleration signal, the improvement in the differential device which further comprises:
 a fluid-operated multiple plate clutch mounted on said differential case and connected to said differential for controlling distribution of said power to said driving wheels;
 a hydraulic control unit for dividing differential oil into hydraulic fluid for control of the clutch and lubrication oil for lubricating said differential and sealing means provided for separating said differential oil from oil for lubricating the final reduction gear;

means comprising a centrifugal pressure chamber formed at said clutch for compensating centrifugal force of said hydraulic fluid so as to enable control of a clutch pressure by counteraction with a larger pressure area having essentially the same diameter as that of said clutch; and
 control means responsive to said degree signal, said steering angle signal, said wheel speed signals, said position signal and said acceleration signal for operating said clutch by said hydraulic fluid so as to drive said driving wheels of said vehicle without sticking and/or slipping in any driving condition, by deriving a duty ratio stored in a map selected in dependency on speed difference of said driving wheels.

2. The differential device according to claim 1, further comprising:
 a carrier housing said differential device,
 said hydraulic control unit is provided inside said carrier.

3. The differential device according to claim 1, said clutch and said differential case are separated from and sealed from said final reduction gear and said pinion gear.

4. The differential device according to claim 1, wherein
 said centrifugal pressure chamber is provided between said clutch and said final reduction gear.

5. The differential device according to claim 1, further comprising
 a clutch housing,
 piston means of said clutch slidably mounted in said clutch housing for operatively engaging plates of the clutch by means of the hydraulic fluid acting on one side of said piston means, and
 a spring connected to said clutch housing and engaging said piston means on the other side of the piston means, said centrifugal pressure chamber being formed between said piston means and said spring.

6. The differential device according to claim 5, wherein
 said housing is said differential case.

7. In a differential device for a power transmission system of a motor vehicle having an engine mounted on said motor vehicle, a transmission connected to said engine, and a propeller shaft connected between said transmission and said differential device for transmitting power from said engine to axles of driving wheels of the vehicle, and a final reduction gear mounted on a differential case and meshed with a pinion gear of said propeller shaft, the differential device comprising the differential case and a differential in the differential case operatively connected to the driving wheels, the vehicle having a throttle sensor for detecting opening degree of a throttle valve and for generating a degree signal, a steering angle sensor mounted on a steering shaft for detecting steering angle of a steering wheel of the vehicle and for generating a steering angle signal, wheel speed sensor for detecting each wheel speed of said driving wheels and for producing wheel speed signals respectively, gear position sensor mounted on said transmission for detecting a shift range and for generating a gear position signal, and an acceleration sensor mounted on said vehicle for detecting acceleration of said vehicle and for producing an acceleration signal, the improvement in the differential device which further comprises:
 a fluid-operated multiple plate clutch mounted on said differential case and connected to said differential for controlling distribution of said power to said driving wheels;
 a hydraulic control unit for dividing differential oil into hydraulic fluid for control of the clutch and lubrication oil for lubricating said differential and sealing means provided for separating said differential oil from oil for lubricating the final reduction gear;
 a cover of said differential device;

a clutch housing fixedly mounted on said cover of said differential device for housing said clutch which is rotatable therein;

guide pin means for preventing said piston from rotating, whereby said piston can actuate said clutch without rotation of the piston;

a thrust bearing interposed between said clutch and said piston, whereby said clutch can freely rotate; and control means responsive to said degree signal, said steering angle signal, said wheel speed signals, said position signal and said acceleration signal for operating said clutch by said hydraulic fluid so as to drive said driving wheels of said vehicle without sticking and/or slipping in any driving condition, by deriving a duty ratio stored in a map selected in dependency on speed difference of said driving wheels.

8. The differential device according to claim 7, wherein said guide pin means is a knock pin mounted in said clutch housing.

9. The differential device according to claim 7, wherein said piston which is slidably mounted in said clutch housing operatively engages plates of the clutch by means of the hydraulic fluid acting on one side of said piston, and a spring connected to said clutch housing and engaging said piston on the other side of the piston, said centrifugal pressure chamber being formed between said piston and said spring.

* * * * *